Dec. 11, 1962    R. E. NICOLSON ETAL    3,068,206
POLYESTER SYNTHETIC RESIN REACTION SYSTEM
Filed Nov. 3, 1958
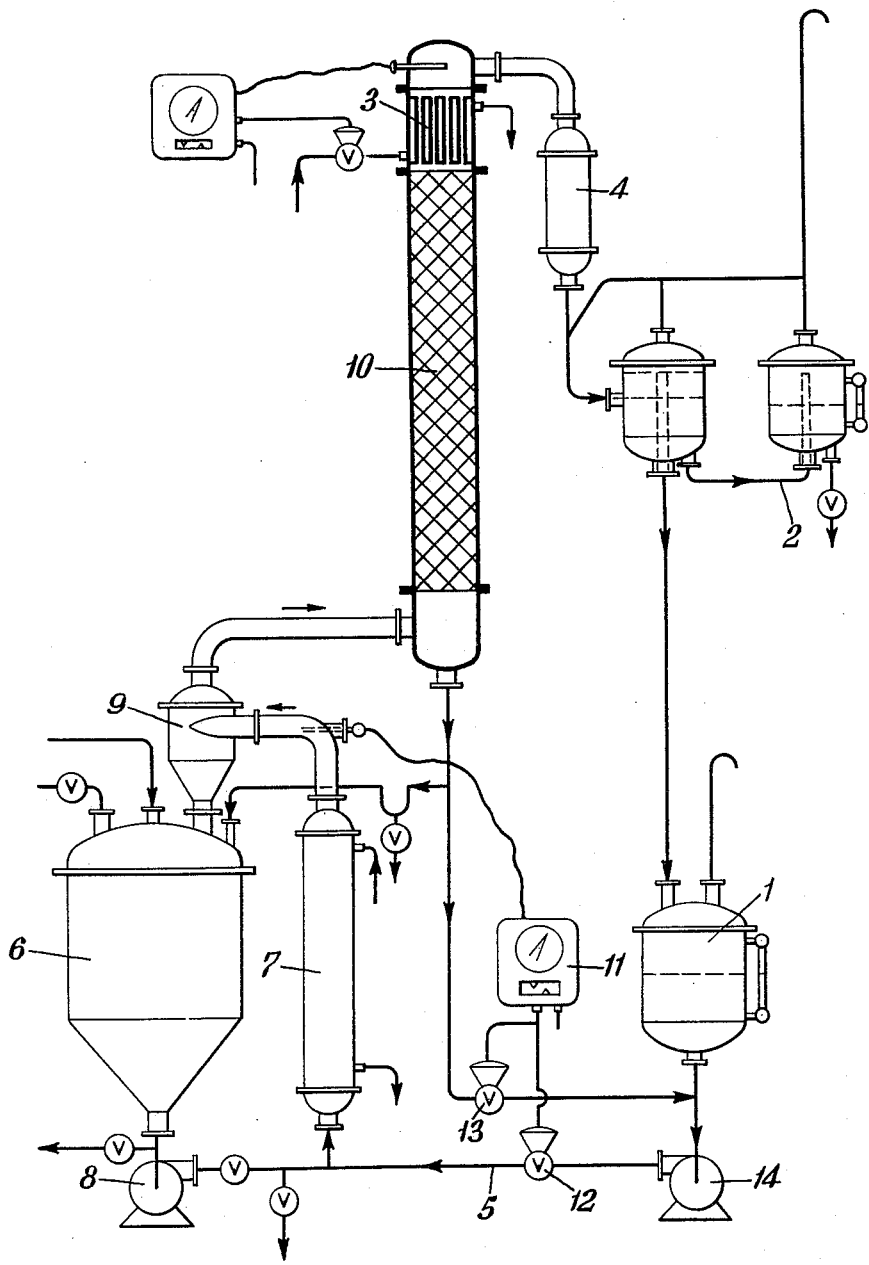
INVENTORS
RICHARD E. NICOLSON
SYDNEY P. SPENCE
BY Michael J. Pantuliano
ATTORNEY United States Patent Office 3,068,206
Patented Dec. 11, 1962

3,068,206
POLYESTER SYNTHETIC RESIN REACTION SYSTEM
Richard E. Nicolson, Martinsville, and Sydney P. Spence, Westfield, N.J., assignors to Union Carbide Corporation, a corporation of New York
Filed Nov. 3, 1958, Ser. No. 771,558
5 Claims. (Cl. 260—75)

This invention relates to synthetic resins and more particularly to a new process and reaction system for manufacturing polyester resins.

The synthetic resins with which this invention is concerned result from the interaction of one or more polyhydric alcohols such as ethylene or propylene glycol or glycerol, and one or more polycarboxylic acids or their anhydrides, such as maleic anhydride, adipic acid, phthalic anhydride and the like with or without modifying agents. The latter include the monocarboxylic fatty acids derived from drying oils, semi-drying oils, and non-drying oils.

One of the chief problems heretofore encountered in the preparation of these polyesters has been the inordinately long reaction period required. It is not uncommon for reactions to last as long as 18 hours in 750 to 1000 gallon production equipment. This long reaction time not only limits the amount of production of the polyesters, but also brings about degradation of the desired product.

The primary or controlling factor in determining the overall reaction speed is the rate at which the water produced by the esterification reaction is removed. Towards that end, various types of equipment and reaction systems have been devised which have a relatively high vaporization efficiency. For example, it has been previously proposed to employ water immiscible solvents as entraining agents, as a means for controlling the rate of water removal, wherein the xylene or other entraining agent is incorporated throughout the entire reaction mass. This method and the other methods heretofore employed in reducing the reaction time have not provided completely satisfactory results since the presence of the entraining agent lowered the average temperature of the reaction mass and slowed the reaction. The time for completion of the reaction therefore has not heretofore been reduced much below six hours. Moreover, since a high evaporation rate is used and a high proportion of the volatile ingredient is vaporized, a significant loss of the more volatile reactants results. Compensation for this loss by the addition of empirically determined excesses of such ingredients is a common feature of the prior processes.

It is an object of this invention, therefore, to provide an improved method, reaction system, and apparatus for the production of polyester resins wherein said resins will be produced in substantially reduced time.

It is also an object of this invention to provide an improved method, apparatus, and system for efficiently vaporizing and removing the water of reaction from the polyester reaction mass while at the same time avoiding a significant loss of reaction ingredients by volatilization.

It is the further object of this invention to provide an improved method, system, and apparatus for producing polyester resins whereby effective use of the available heat for rapid removal of the water of reaction is provided. Other objects will appear hereinafter.

In the usual reaction system employed in producing the polyester resins with which this invention is concerned, the main elements are a reaction vessel or tank which can be, if desired, unjacketed and unagitated, a forced circulation evaporator, and a fractionating and condensing unit which normally consists of a packed column, dephlegmator, condenser, and a decanter.

It has now surprisingly been discovered that if the entraining liquid is injected or introduced into the above-indicated forced circulation evaporator system at a point just prior to the entrance of the evaporator, the objects of this invention are realized. That is to say, the reaction time for producing the polyester resins is substantially reduced, and, when this feature is coupled with the use of an independent entrainer holding tank and feeding system, a more efficient regulation of the ratio of entrainer to reactants results. Moreover, the water of reaction will also be more effectively removed at all stages of the reaction through more effective use of the available heat, and a significant loss of the reaction ingredients by volatilization will be avoided.

Reference may be had to the accompanying drawing for an illustration of one embodiment of the invention. This is for illustrative purposes only and is not to be construed as a limitation of the invention as it is otherwise disclosed and set forth herein.

Before the start of the run, the entrainer storage tank 1 is filled with an entraining agent and the heated decanting system 2 is partially filled with hot water. In the present instance, the entraining agent employed was xylene. The cooling water control systems for both the dephlegmator 3 (partial condenser) and total condenser 4 and the xylene feed system 5 are activated.

The polyhydric alcohol-polycarboxylic acid or anhydride ingredients are first warmed to 100° C.–125° C. in a steam heated auxiliary mixing vessel and then transferred into the reaction vessel 6. This is done to dissolve any solid reactants which might otherwise block the evaporator tubes, 7.

As soon as the reactor is charged, the circulating pump 8 is started and the heating medium is admitted into the jacket of the evaporator 7. The circulating stream is heated from the initial charge temperature to the initial boiling temperature in about 10 minutes.

The rate of water evolution at the start of boiling is high despite the absence of xylene entrainer at this stage. Water vapor containing some volatilized reaction ingredients is separated from the reaction mass in a conventional vapor-liquid separator 9 and passes up through the packed column 10 to the dephlegmator 3. Here a small amount of refluxing occurs. The reflux rate can be automatically regulated to produce a separation so that only water vapor passes overhead and reaction ingredients are returned directly to the reaction vessel, since reflux by-pass valve 13 is closed during the warm-up period. The overhead vapor is condensed and enters the decanter 2.

As the water content of the reaction mix becomes rapidly depleted, the temperature rises, approaching the set-point of the reaction temperature controller 11 (220° C.–240° C.). As the temperature which will activate this control mechanism is approached, this temperature controller gradually opens the xylene control valve 12 admitting xylene entrainer into the circulating reaction stream as it enters the evaporator 7. Simultaneously controller 11 opens reflux by-pass valve 13, thus permitting reflux from column 10 to be recycled through the entrainer pump 14. The addition of xylene aids in the removal of water and serves to regulate the temperature of the reaction mix. The boiling mixture leaving the evaporator 7 is preferably fed to a vapor-liquid separator 9 wherein the liquid ingredients are separated and allowed to flow back into the reaction vessel 6. The vapor stream leaving the separator 9 (water, xylene and traces of reaction ingredients) passes up through a packed fractionation column 10, counter-current to the reflux. At the dephlegmator 3, located at the top of the packed column 10, a portion of the overhead vapor stream is condensed to supply the reflux required to maintain the desired separation whereby any vaporized reaction ingredients are returned to the reaction system. Meanwhile, the xylene and water, plus some excess xylene, pass overhead to the total condenser 4. This vapor is condensed at a controlled temperature of 65° C. in order to obtain the most efficient phase separation of xylene and water layers in the decanting system 2. The xylene upper layer overflows a standpipe into the xylene storage tank 1 for recycle. The bottom (water) layer continously overflows in a conventional manner into a receiver or to waste.

As the xylene recycle rate increases in accordance with diminishing rate of water production, a somewhat greater quantity of xylene remains dissolved in the main reaction mass. This increase in total xylene requirements is, however, not large because the amount of reflux from the packed column 10 is simultaneously diminishing. This latter effect is a consequence of the reduced amounts of reaction ingredients which must be fractionated out of the vapor stream in the later stages. Hence, the reflux requirements for maintenance of the prescribed overhead vapor temperature are reduced. The small net increase in the amount of entrainer required as the esterification proceeds is provided for in the sizing of the xylene storage tank.

The reaction can be followed by gauging the acid number of the polyester product in the reaction vessel. The acid number can be determined by titration of samples of the reaction products with potassium hydroxide and is generally expressed as milligrams of KOH per gram of sample. For the polyester formulation cited as an example the required acid number end point was approximately 12 (indicated by milligrams, KOH per gram product). Samples for this purpose are withdrawn at intervals during the course of a run and the results are plotted to obtain a predicted time to halt the reaction.

In order to arrest the reaction and cool the reaction mixture, the fractionating column is put on total reflux by indexing the dephlegmator controller to a low temperature and, if desired, by also applying a reduced pressure to the system. At the same time, the heating medium supply to the evaporator is closed off. The completed reaction batch is discharged after cooling to a suitable handling temperature.

In the following examples, a reaction charge for a 30 gallon reactor 6 was prepared consisting of the following ingredients:

Material: Amount, lbs.
Soya fatty acid _____ 88.0
Phthalic anhydride _____ 57.6
Maleic anhydride _____ 2.87
Glycerine _____ 35.8
2-ethyl-hexanol _____ 16.3

In Table I the general data for five examples employing the above charge is indicated. The runs indicated in these examples were carried out in accordance with the afore-described procedure. Also given for reference is the data for similar charge runs (Examples 6–10) in a conventional still. These data are also recorded in Table I. It will be noted that the reaction time in the conventional still was from four to five times as long as in the unit of this invention.

The conventional runs indicated were made in a jacketed 350 gallon, stirred autoclave equipped with a condenser but without external recirculation of reactants through a calandria.

In the usual conventional procedure, the ingredients, except the entraining agent, were charged and warmed to about 150° C. at which time the solids began to dissolve. The temperature was then slowly increased to 200° C., whereby the water was distilled and was removed overhead. After heating at 200° C. for an extended time (6–8 hours), the evaporation slowly diminished, owing at this point to reduced heat transfer as the viscosity increased. Xylene was then added to the charge in small increments to help sustain a reasonable evaporation rate during the remainder of the run. The total amount of xylene or other entraining agent that could be added was limited because it tended to lower the boiling point of the reaction mass, thereby slowing the reaction. The amount of xylene found most useful in the conventional runs was found to be between 10–12 percent of the reaction mix. This represented the best compromise between the conflicting needs for a low reaction mix viscosity (to promote rapid heat transfer and water removal) and a high reaction temperature (to speed the rate of reaction and the formation of water which the evaporation is intended to remove). Increasing the solvent content lowers the boiling temperature, hence maximum effectiveness with regard to both evaporation rate and reaction rate could not be achieved simultaneously in the conventional polyester reaction system.

*Table I*

| Example No. | Unit of This Invention | | | | | Conventional Unit | | | | |
|---|---|---|---|---|---|---|---|---|---|---|
| | 1 | 2 | 3 | 4 | 5 | 6 | 7 | 8 | 9 | 10 |
| Reaction Time (min.) | 216 | 195 | 234 | 204 | 194 | 975 | 873 | 985 | 880 | 840 |
| Reaction Temp., °C | 256 | 220 | 210/220 | 215/223 | 232/214 | 198/202 | 198/204 | 198/204 | 194/204 | 194/204 |
| Decanter Sep. Temp., °C | 40–60 | 40–60 | 50–60 | 60–65 | 64–73 | 25 | 25 | 25 | 25 | 25 |
| Xylene Recycle Temp., °C | 25–30 | 24–49 | 38–50 | 39–59 | 36–54 | 25 | 25 | 25 | 25 | 25 |
| Xylene Content Start, percent | 0 | 0 | 0 | 0 | 0 | 3.8 | 3.8 | 0 | 0 | 0 |
| Xylene Content End, percent | 2.1 | 3.8 | 6.6 | 5.8 | 7.3 | 9.1 | 9.4 | 10.0 | 10.0 | 10.0 |
| Acid Value End | 12.6 | 12.0 | 10.7 | 11.6 | 10.7 | 11.6 | 11.6 | 11.9 | 11.2 | 11.1 |
| Viscosity, 25° C., cst | 62,200 | 40,000 | 14,900 | 14,900 | 81,400 | 10,000 | | | 10,800 | 6,800 |
| Ratio xylene/reactants employed | 2.1/97.9 | 3.8/96.2 | 6.6/93.4 | 5.8/94.2 | 7.4/92.7 | 9.2/90.9 | 9.4/90.6 | 10.0/90.0 | 10.0/90.0 | 10.0/90.0 |

Comparison of the reaction times taken at any point in the course of the reaction, as indicated by the rate of acid value decrease, will indicate the same proportional ratio indicated above, i.e., the conventional unit will have expended four or five times the reaction time as the unit of this invention.

The quantity of entraining agent involved in this invention is not large since it is continuously condensed and recycled and because it only momentarily contacts a portion of the reaction material at any one time. The amount of entraining agent will vary in accordance with the specific polyesters being formed. Of course, it must be in sufficient amounts to effectively entrain substantially all the water of reaction. By regulating the amount of xylene or other entraining agent, an independence of control over the reaction temperature of the reaction system is obtained.

The entraining agents which may be used are not critical to this invention. Among those suitable besides xylene are benzene, toluene, hexane, and heptane.

The choice of entraining agent is primarily dependent upon empirical factors in the polyester formula. It must be highly immiscible with water, inert to the reaction, and a good solvent for the reaction mass for purposes of reducing viscosity.

High vaporizing efficiency, which is independent of still size, is further achieved by pumping the reaction material at high velocity through the tubes of an external evaporator. The still or reaction tank, divested of the usual mixing and heat transfer functions of this design, is simply a thermally insulated holding tank for the main bulk of the reaction material.

Such functions as charging, premixing, and warming the reactants prior to a run are advantageously carried out in a steam heated auxiliary blending tank. Although not necessary for the practice of this invention, the mixture of reactants is then transferred to the reaction system. Similarly, cooling and other final operations on reacted batches are best conducted during or after discharge from the reaction system. In this manner the most efficient use is made of the more specialized items of equipment in the high temperature reaction system.

As aforementioned, the injection of the entrainer into the circulating reaction stream just ahead of the evaporator tube bundle has provided surprising and unusual results in reducing the reaction time of polyester systems. This feature, coupled with the use of an independent entrainer-holding tank and feeding system, permits regulation of the ratio of entrainer to reactants to provide the optimum usage of the available heat for water removal at all stages of the reaction. This ratio can be varied independently of the entrainer content of the total reaction mix.

As also indicated previously, at the start of the reaction little or no entrainer is required to aid in the removal of the water of reaction. At this point water is abundant and the presence of an entrainer only serves to hinder water evaporation by competing for the available heat. The required concentration of entrainer for optimum utilization of the available heat then steadily increases as the reaction proceeds. The optimum entrainer concentration is produced at the place where it is needed (the inlet to the evaporator tube bundle) by controlling the entrainer feed rate so as to produce the desired evaporator discharge temperature.

The invention is broadly applicable to the production of any polyester resin produced by the reaction of an aliphatic polyhydric alcohol and an aliphatic or aromatic polycarboxylic acid or anhydride. In this regard, the temperature of reaction and pressure necessary will vary according to the polyester to be produced. If desired, any suitable inert gas may be employed in the system, although $CO_2$, $N_2$ and argon are preferable.

As indicated, the temperature of the reaction is not critical. The highest temperature that can be used without degrading the product is the usual basis for choice. Temperatures have been employed ranging from below room temperature to above 300° C., although it is preferred to operate the process at temperatures of from room temperature to 300° C.

As seen in the foregoing, in conventional units the need for a solvent in the reaction mass to reduce viscosity and thereby aid in heat transfer, and to entrain the water of reaction, conflicts with the need for a high reaction temperature throughout the mass to promote the desired molecular weight formation and release of water.

This invention, on the other hand, provides for independent control of the solvent content of the reaction mass in the residence vessel and the solvent content of the material passing through the evaporation portion of the unit. Therefore, the following is obtained:

(1) Lower viscosities at the heat transfer surface, thereby giving higher heat transfer coefficients than possible without the additional solvent.

(2) Maximum usage of entrainer relative to the available heat supply.

(3) Reaction temperatures in the residence vessel which are within a few degrees of the maximum temperature leaving the evaporator tube bundle.

(4) Owing to reduced retention times, higher temperatures than heretofore possible may be used without degradation.

What is claimed is:

1. Process for producing a polyester resin including the steps of forming a reaction mixture free of liquid hydrocarbon diluents and containing an aliphatic polyhydric alcohol and an acidic material selected from the group consisting of aliphatic polycarboxylic acids, aromatic polycarboxylic acids, aliphatic polycarboxylic acid anhydrides and aromatic polycarboxylic acid anhydrides, heating said reaction mixture in a reaction zone at a temperature sufficient to form a polyester resin and water, separating from the reaction mixture water as it is evolved, continuing the reaction until the rate of water evolution decreases, thereupon removing a portion of the reaction mixture from the reaction zone, adding to the removed portion of the reaction mixture at a point outside the reaction zone an inert liquid hydrocarbon entraining agent in an amount sufficient to entrain substantially all the water of reaction in said removed portion of the reaction mixture, separating from the removed portion of the reaction mixture substantially all of the water and substantially all of the entraining agent, said entraining agent being separated at least in part as an azeotrope with the water and recovering the polyester thus produced.

2. Process as claimed in claim 1 in which the entraining agent is an aromatic hydrocarbon.

3. A process as claimed in claim 2 in which the entraining agent is xylene.

4. A process as claimed in claim 3 in which the xylene is introduced into the circulating reaction system when the temperature of said reaction stream reaches a prescribed set point.

5. A process as claimed in claim 4 in which the xylene is introduced into the removed portion of the reaction mixture when the temperature of said removed portion is between room temperature and 300° C.

References Cited in the file of this patent

UNITED STATES PATENTS

| 2,279,764 | Smith et al. | Apr. 14, 1942 |
| 2,892,812 | Helbing | June 30, 1959 |
| 2,892,813 | Georgian et al. | June 30, 1959 |

OTHER REFERENCES

Groggins: Unit Processes in Organic Synthetics, pages 635 and 636, McGraw-Hill Book Co., Inc., New York, N.Y., 1952.